(12) United States Patent
Gilman et al.

(10) Patent No.: US 6,628,826 B1
(45) Date of Patent: Sep. 30, 2003

(54) COLOR REPRODUCTION OF IMAGES FROM COLOR FILMS

(75) Inventors: Paul B. Gilman, Penfield, NY (US); John S. Setchell, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/451,301

(22) Filed: Nov. 29, 1999

(51) Int. Cl.[7] .................................................. G06K 9/00
(52) U.S. Cl. ........................................ 382/167; 358/518
(58) Field of Search .............................. 382/162, 167; 358/500, 501, 504, 515–523, 527–532, 537; 355/32, 38, 77, 67; 345/431, 150–155; 348/97, 96; 399/38–41, 56, 51, 53–54, 133, 184, 178, 179; 430/380, 359, 362

(56) References Cited

U.S. PATENT DOCUMENTS

| | | | | |
|---|---|---|---|---|
| 5,317,425 A | * | 5/1994 | Spence et al. | 358/504 |
| 5,363,318 A | * | 11/1994 | McCauley | 358/519 |
| 5,416,613 A | * | 5/1995 | Rolleston et al. | 358/518 |
| 5,491,568 A | * | 2/1996 | Wan | 358/518 |
| 5,667,944 A | * | 9/1997 | Reem et al. | 430/359 |
| 5,745,215 A | * | 4/1998 | Miyauchi et al. | 355/38 |
| 5,747,228 A | * | 5/1998 | Bohan et al. | 430/380 |
| 5,760,913 A | * | 6/1998 | Falk | 358/518 |
| 6,018,381 A | | 1/2000 | Vanderbrook et al. | |
| 6,130,756 A | * | 10/2000 | Grady et al. | 358/1.1 |
| 6,141,080 A | | 10/2000 | Masuda | |
| 6,219,446 B1 | * | 4/2001 | Kiriki et al. | 382/167 |

FOREIGN PATENT DOCUMENTS

| | | | | |
|---|---|---|---|---|
| EP | 624028 | * | 6/1994 | H04N/1/46 |
| EP | 0 857 998 | | 8/1998 | |

OTHER PUBLICATIONS

Digital Color Management Encoding Solutions by E. Giorgianni et al., p. 247, 1997.
A Color–Rendition Chart by C. s. McCamy et al., Journal of Applied Photographic Engineering: vol. 2, No. 3, 1976.

* cited by examiner

*Primary Examiner*—Jingge Wu
(74) *Attorney, Agent, or Firm*—Raymond L. Owens

(57) ABSTRACT

A color photographic film element, including a substrate and a plurality of image capture color photosensitive layers formed over the substrate; and one or more patches formed in the film element by exposure, each color patch including information which permits the mapping of a digitized color image from a developed image captured in the color photosensitive layers to construct a profile usable in modifying the digital image.

7 Claims, 2 Drawing Sheets

COLOR REPRODUCTION OF IMAGES FROM COLOR FILMS

CROSS REFERENCE TO RELATED APPLICATION

Reference is made to commonly assigned U.S. Patent application Ser. No. 09/451,303, filed Nov. 29, 1999, entitled "Constructing Profiles to Compensate for Nonlinearities in Image Capture". The disclosure of this related application is incorporated herein by reference.

FIELD OF THE INVENTION

The present invention relates to color film elements which include a chart having patches that can be used to construct a profile when an image from the film is scanned.

BACKGROUND OF THE INVENTION

It is well known to expose silver halide films to various test targets for a variety of reasons such as the calibration of printing equipment and chemical process monitoring.

Profiles of digital imaging components are valuable in that they permit the connection of a variety digital input devices to a variety of digital output devices to achieve consistent color reproduction.

Color management software programs such as Kodak ColorFlow 2.1 have been devised to permit the building of profiles using digital cameras to photograph a test target such as the Macbeth ColorChecker.

There are problems with existing scanning techniques when a digital image is produced from color films. When the film is scanned, the image therein may have been degraded due to storage problems, chemical processing, exposure errors, illuminant variations or the image scanning device is not calibrated properly.

SUMMARY OF THE INVENTION

It is an object of the invention to provide a color photographic film element which includes information that can permit the scanning of images produced therefrom to have a high quality even though the original image produced by the film may be degraded.

This object is achieved by a color photographic film element, comprising a) a substrate and a plurality of image capture color photosensitive layers formed over the substrate; and b) a Test Chart having patches formed in the film element by exposure, each color patch having information which permits the mapping of a digitized color image from a developed image captured in the color photosensitive layers to construct a profile usable in modifying the digital image.

This object is also achieved in a method of producing an improved digital image comprising the steps of:

(a) scanning a color photographic film which includes an image and a chart having patches including information which permits the mapping of the digitized color image from a developed image captured in the color photosensitive layers;

(b) constructing a profile from the scanned patches useable in modifying the digital image; and (c) using the profile to modify the scanned digital image.

It has been found that commercially available color management software such as Kodak ColorFlow 2.1 software can also be used to build profiles from scanned and digitized color films if the color film has on it a developed image of a Test Chart such as the Macbeth ColorChecker.

There are many advantages to be able to build ICC Profiles in accordance with the present invention from color films including improved color reproduction of color prints; extended expiration date of color films; improved exposure latitude; improved color reproduction from a variety of lighting conditions; improved color reproduction from chemical process variations; and consistent color reproduction from a variety of film scanners.

DETAILED DESCRIPTION OF THE PREFERRED EMBODIMENTS

It has been discovered that by forming a Test Chart having color patches on a color film element, profiles can be constructed for the purpose of improving the color reproduction of digital color prints.

Figure 1:
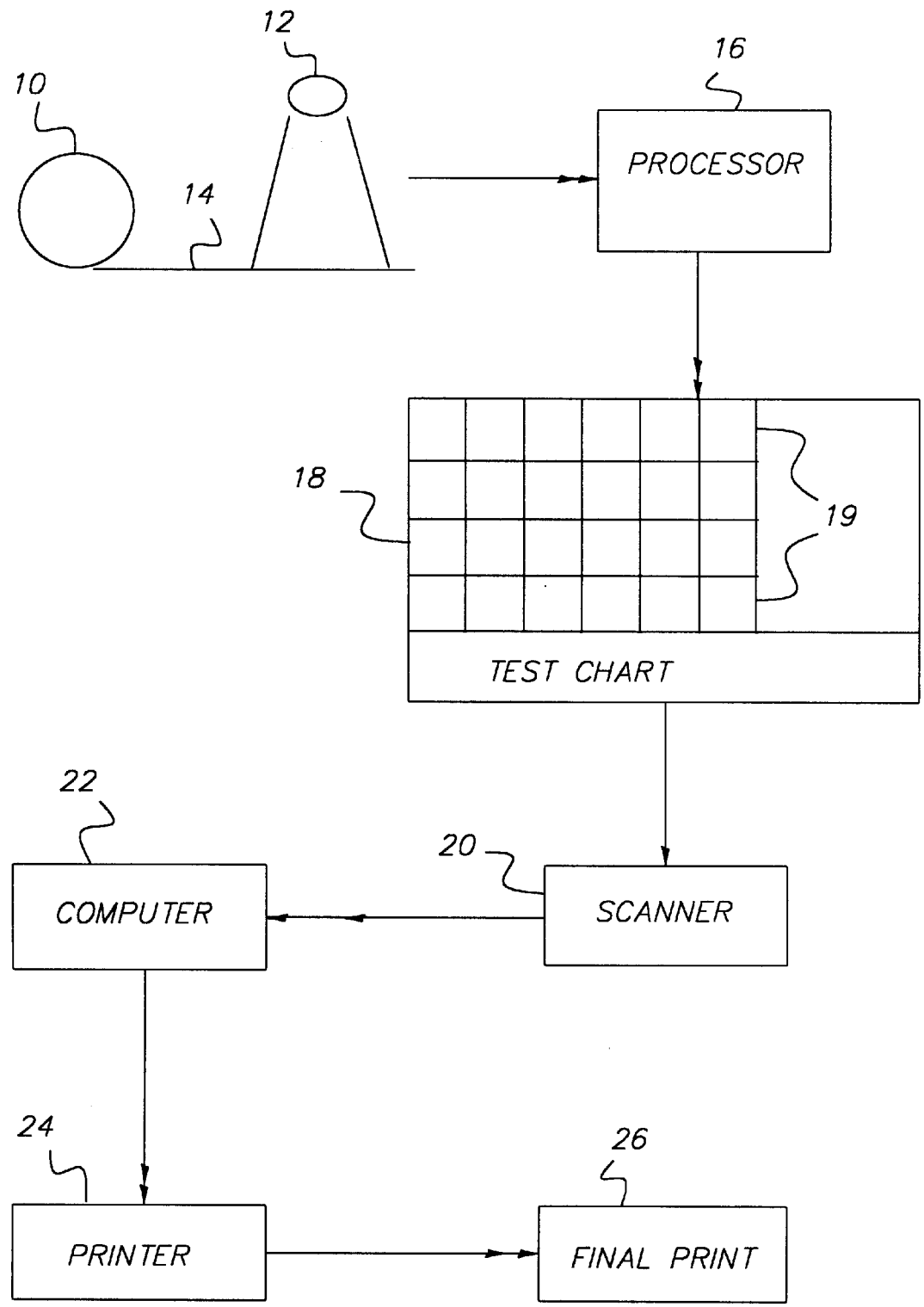
FIG. 1 shows the sequence of steps to obtain the color corrected print from a film original.

Turning first to FIG. 1 which shows a sequence of steps to be used in accordance with the present invention. A roll 10 of unprocessed film 14 is shown to be moved in front of an exposure system 12. It will be understood to those skilled in the art that this exposure system 12 can be part of a conventional camera, enlarger or digital writer. However, it is not limited to these devices but could be done in the manufacturing process of the film 14 which is an important aspect of the present invention. Block 16 represents traditional film processing equipment wherein a film element with an acquired image and an acquired Test Chart 18 is developed. The Test Chart includes a plurality of color patches 19. An example of a well known Test Chart used in accordance with the present invention is the MacBeth ColorChecker. Of course, there can be a plurality of patches which are acquired using a single chart as will be described hereinafter. The developed film with the Test Chart 18 results. Images can also be acquired by another capture device. In other words, the Test Chart can be captured on the film first and subsequently, normal photographic images can be captured by the another acquisition device, such as a conventional camera. A conventional film scanner 20, which can include a linear CCD, scans the Test Chart 18 at least once for each roll of film. It then also scans the images to be digitized. The scanner 20 provides input into a computer 22 which uses the scanned Test Chart 18 to construct a profile, and this profile is used to modify the scanned digital image provided by the scanner 20. This process will be described in detail later in this specification. The computer 22 provides the color managed digital image to a printer 24. The printer 24 can take a number of forms known in the art such as a silver halide photographic printer, a thermal printer, an inkjet printer, or an electrophotographic printer. The printer 24 produces a final print 26 with an improved image.

After images are acquired and developed, the film image of the chart 18 with the color patches and images are scanned to provide a digitized image and a digitized chart.

A typical Test Chart useful in the invention is one that includes a well spaced series of neutral patches ranging from white to black, a wide gamut of chromatic colors, additive and subtractive primaries and patches having the same spectral characteristics as objects commonly found in nature. An example of such a chart is the Macbeth ColorChecker.

The properties of this Test Chart are described in the publication: A Color-Rendition Chart: C. S. McCamy, H. Marcus, and J. G. Davidson: Journal of Applied Photographic Engineering: Volume 2, Number 3: 1976.

Profiles as used in Color Management of digital images are described in the book: Digital Color Management, Encoding Solutions: E. J. Giorgianni and T. E. Madden, Addison-Wesley, p242: 1997. A profile is defined as "a digital signal-processing transform, or collection of transforms, plus additional information concerning the transform, device and data". A source profile, for example, provides information necessary to convert input device values to color values expressed in a profile connection space. A profile connection space is a device independent color space used for linking source profiles to destination profiles to enable improved color reproduction of printed images from input devices such as scanners or digital cameras to output devices such as monitors or digital printers.

A typical software program which is designed to construct profiles is the Kodak ColorFlow 2.1 program. To construct and use a film profile, the procedure is as follows:

A piece of photographic film is exposed to a test target with known spectral properties such as a Macbeth ColorChecker. This may be by use of a conventional camera, enlarger or by a digital writer.

The film is processed and the resulting image is scanned and digitized with a scanner such as a Nikon LS 2000 film scanner to produce a digital file.

It has been found useful to set the white point of the whitest patch of the digital file of the Macbeth ColorChecker to 252 for each of the red green and blue values prior to building the profile. This step is easily done in Adobe® Photoshop® software and has been found useful to compensate for exposure errors and for variations in scene illuminants when the test cart is not in the scene being photographed. For the most effective use of this neutral balanced profile, the digitized image scene should also be neutral balanced in the same way before the profile is applied for subsequent printing.

Using a Macintosh Computer or other type of Personal Computer, the digital file of the Test Chart is imported into the Kodak ColorFlow 2.1 software program and following a series of steps in the program menu, a film profile is constructed and saved for future use.

Using the computer with Adobe Photoshop 4.0 software, a scanned and digitized image scene taken on the same roll of color film is imported and viewed.

Using the Adobe Photoshop 4.0 software and a plug in installed from the Kodak ColorFlow 2.1 software a FILTER is applied using the SOURCE as the Profile created in step 3. The DESTINATION profile is applied for the printer-paper combination.

The two profiles are combined with the Adobe Photoshop software and used to render the image from its raw unprocessed form to one color managed to produce a print which has greatly improved color reproduction compared to a non color managed image.

Figure 2:
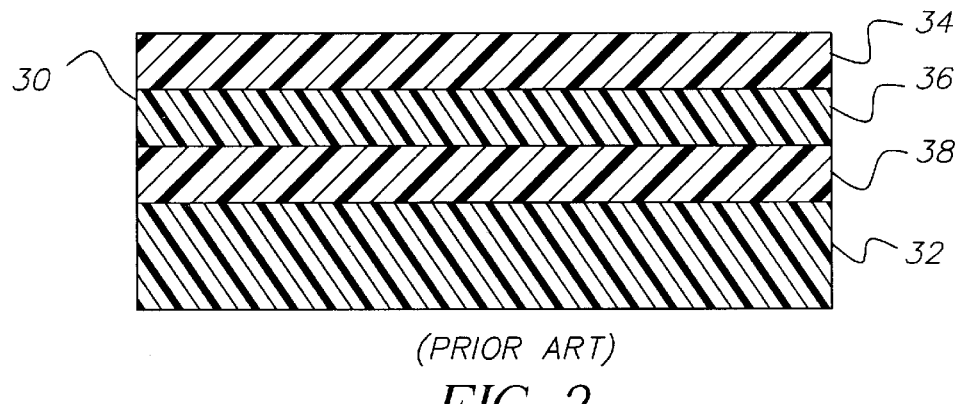
FIG. 2 is a cross section of a conventional photographic film that can be used in accordance with the present invention.

FIG. 2 shows, in schematic form, a photographic element 30 having a support 32 having at least three different silver halide emulsion layers 34, 36, and 38. Those skilled in the art will realize that many more layers can be used and are used in conventional photography, but this brief description should be sufficient for one skilled in the art to appreciate that a conventional photographic film can be used in accordance with the present invention. It will be understood that in classical black-and-white photography a photographic element containing a silver halide emulsion layer coated on a transparent film support is imagewise exposed to light. This produces a latent image within the emulsion layer. The film is then photographically processed to transform the latent image into a silver image that is a negative image of the subject photographed. Photographic processing involves developing (reducing silver halide grains containing latent image sites to silver), stopping development, and fixing (dissolving undeveloped silver halide grains).

In conventional color photography the photographic element contains three superimposed silver halide (color photosensitive) emulsion layers or layer units 34, 36, and 38. Layer 34 forms a latent image corresponding to blue light (i.e., blue) exposure, layer 36 forms a latent image corresponding to green exposure and layer 38 forms a latent image corresponding to red exposure. During photographic processing, developing agent oxidized upon reduction of latent image containing grains reacts to produce a dye image with developed silver being an unused product of the oxidation-reduction development reaction. Silver is removed by bleaching and fixing during photographic processing. The image dyes are complementary subtractive primaries-that is, yellow, magenta and cyan dye images are formed in the blue, green and red image recording units, respectively. This produces negative dye images (i.e., blue, green and red subject features appear yellow, magenta and cyan, respectively).

In one common variation of conventional color photography reversal processing is undertaken to produce a positive dye image in the color photographic element, commonly referred to as a slide, the image typically being viewed by projection. In another common variation, referred to as color image transfer or instant photography, image dyes are transferred to a receiver for viewing.

In each of the conventional forms of photography noted above, the final image is intended to be viewed by the human eye. Thus, the conformation of the viewed image to the subject image, absent intended aesthetic departures, is the criterion of photographic success.

It is well known to those skilled in the art that the colors reproduced on, or produced from, a photographic color-imaging element generally are not colorimetric matches of the colors originally photographed by the element. Colorimetric errors can be caused by the color recording and color reproduction properties of the photographic element and system. The distinction between the color recording and color reproduction properties of a photographic element is fundamental. Color recording by a photographic element is determined by its spectral sensitivity. The spectral sensitivity of a photographic element is a measure of the amount of exposure of a given wavelength required to achieve a specific photographic response. Color reproduction by a photographic imaging system depends not only on the color recording properties of the capturing element as described above, but also on all subsequent steps in the image forming process. The color reproduction properties of the imaging element or system can vary the gamma, color saturation, hue, etc. but cannot fully compensate for problems caused by spectral sensitivities which are not correlates of the human visual system. Metamers are an example of such a problem. Metamerism occurs when two stimuli with different spectral reflectance appear identical to the eye under a specific illuminant. A photographic element whose spectral sensitivities differ from that of the human visual system record the stimuli differently. Once recorded as disparate, a photographic element's color reproduction will only amplify or minimize that difference.

In certain applications, it is desirable to form image representations that correspond more closely to the colorimetric values of the colors of the original scene recorded on the photographic color-imaging element rather than form image representations which correspond to the reproductions of those colors by the element itself. Examples of such applications include, but are not limited to, the production of medical and other technical images, product catalogues, magazine advertisements, artwork reproductions, and other applications where it is desirable to obtain color information which is a colorimetrically accurate record of the colors of the original scene. In these applications, the alterations in the color reproduction of the original scene colors by the color recording and color reproduction properties of the imaging element are undesirable.

To achieve absolute colorimetric accuracy during recording, the photographic element's spectral sensitivity must be color-matching functions. Color-matching functions are defined as the amounts of three linearly independent color stimuli (primaries) required to match a series of monochromatic stimuli of equal radiant power at each wavelength of the spectrum. A set of three color stimuli is linearly independent when none of the stimuli can be matched by a mixture of the other two. Negative amounts of a color stimulus are routine in color-matching functions and are interpreted as the amount of that color stimulus which would be added to the color being matched and not to the mixture itself. Color-matching functions for any real set of primaries must have negative portions. It is possible to functionally transform from one set of color-matching functions to any other set of color-matching functions using a simple linear transformation. By using the color-matching functions which correspond to the primaries of the intended output device or medium as the photographic element's spectral sensitivities, no additional color signal processing is necessary.

The silver halide emulsion image recording units can take any convenient conventional form capable of forming a latent image in response to imagewise exposure within the selected regions of the spectrum. In the simplest possible form, the emulsion image recording units contain grains of the same silver halide or combination of silver halides. The silver halide emulsion layer whose sensitivity falls predominantly in the blue region of the spectrum may rely on native spectral sensitivity. All emulsion image recording units can contain one or more spectral sensitizing dyes extending sensitivity to any desired region of the spectrum and/or enhancing sensitivity within the region of native sensitivity. To the extent that spectral sensitizing dye rather than native silver halide absorption of exposing radiation is relied upon for latent image formation during exposure, it follows that the emulsion image recording units can be formed of any combination of silver halides. Further, it is immaterial whether the same silver halides are selected for each emulsion image recording unit.

In the simplest contemplated form, each emulsion image recording unit produces a spectrally distinguishable image. A preferred way of producing spectrally distinguishable images is to have image dye formation occur in each image recording unit in proportion to the amount of silver development produced during processing where a different dye hue is produced in each of the three image recording units. The dye image requirement is preferably satisfied by incorporating in each emulsion image recording unit a different dye-forming coupler. Conventional photographic imaging dyes have relatively narrow absorption profiles, with half maximum absorption widths (hereinafter also referred to as half-peak absorption bands) typically well below 125 nm. It is preferred that the dye images produced in the three emulsion image recording units have non-overlapping half peak absorption bands. That is, preferably the half peak absorption band width of each image dye occupies a portion of the spectrum that is unoccupied by the half peak absorption band width of any other image dye contained in the photographic element after processing. Nevertheless, it is possible to discriminate between different image dyes even if some overlap of the half peak band widths occurs. It is common to have the three image dyes produced absorb primarily in the blue, green and red regions of the spectrum and are referred to as yellow, magenta and cyan image dyes, respectively.

Figure 3A:
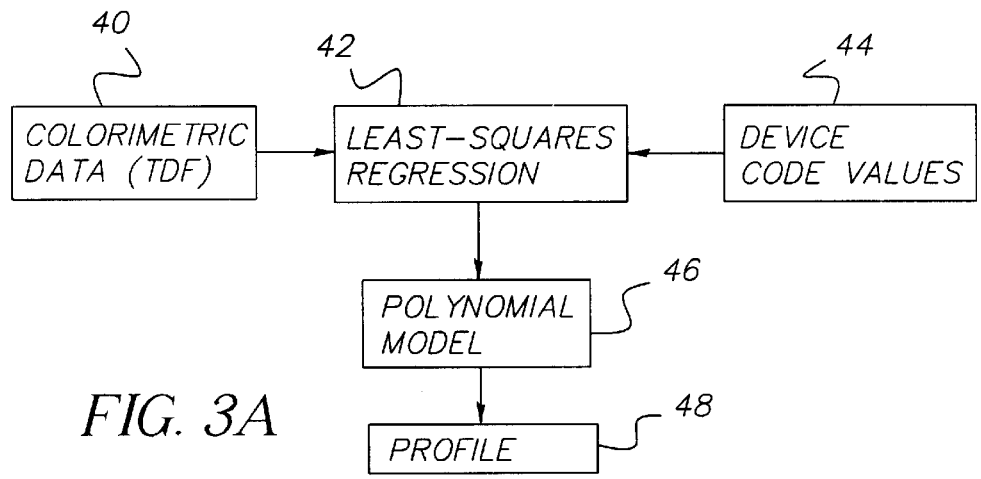
FIG. 3A illustrates the construction of the profile by the computer 22 shown in FIG. 1.

In FIG. 3A Colorimetric Data 40 often in the form of a target description file (TDF) for a target (not shown), is combined with digital Device Code Values 44 relating to the same target in a mathematical process such as Least-squares Regression 42 to produce a mathematical model such as a Polynomial Model 46. This model is then used to construct a Profile 48 containing one or more transforms and other data describing the device.

In the case of an image capture device, the colorimetric data is typically obtained by measuring with a spectrophotometer or calorimeter a target which is then captured by the image capture device. The image capture device produces a digital image of the target, from which the device code values are obtained. In the case of an image display device, the process is reversed; device code values for a digital target image are supplied to the device, which then produces a real image, either hard copy in the case of a printer, or softcopy in the case of a cathode ray tube (CRT) display or liquid crystal display (LCD. The colors of this real image are then measured with the aforesaid spectrophotometer or colorimeter. In either case, colorimetric data and device code values are combined in the process described above to produce a profile.

The file format for profiles, and to a certain degree the architecture for image processing software using them, is the subject of a standard developed by the International Color Consortium (ICC) now widely adopted in the industry. (The standard may be downloaded from the ICC web site, http://www.color.org.) It will be understood by one skilled in the art that the practice taught in the present invention is applicable to the ICC system but not limited to it.

Figure 3B:
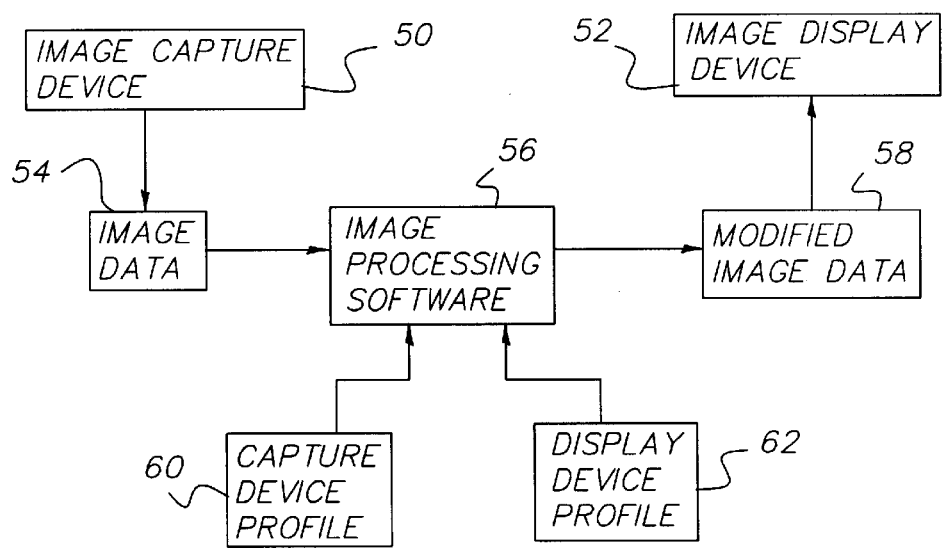
FIG. 3B is a flow chart of the operation of computer 22 shown in FIG. 1 which illustrates the application of the profile to digitized images to modify digital images.

Digital imaging systems may typically employ a technique known as color management to provide the desired color and tone characteristics of an output image. An embodiment of this color management technique is diagrammed in FIG. 3B. The image is acquired by an Image Capture Device 50 which may be a digital camera, a film scanner, a print scanner, or other device. The digital Image Data 54 from the Image Capture Device is input to Image Processing Software 56 residing in a host computer (not shown). Also input to the Image Processing software are a Capture Device Profile 60 and a Display Device Profile 62. These profiles contain information about the color processing characteristics of their respective devices. The Image Processing Software uses this information to produce Modified Image Data 58 which is then supplied to an Image Display Device 52. The Image Display Device may be a thermal printer, ink jet printer, electrophotographic printer, photographic printer, CRT display, LCD, or other display device.

EXAMPLE 1

Extended Expiration Date of Color Films

When some Kodak Kodacolor II color negative film which had an expiration date on the box of 1982 was exposed to a Macbeth ColorChecker, then color processed normally, the resulting image was very low in contrast, foggy and heavily magenta in cast which made it very difficult to make a conventional optical print of pleasing quality. However, when the negative was scanned and digitized with a Nikon LS 2000 film scanner with all the color management turned off, a profile was built for the negative using the Kodak ColorFlow 2.1 software. When the profile for the color negative was combined with the profile for the Epson Stylus Photo 700 ink jet printer using Adobe Photoshop 4.0, high quality, digital color prints were made that were very close in print quality to those made from any fresh, modem color negative film.

EXAMPLE 2

Improved Exposure Latitude for Reversal Films

Kodak Ektachrome Plus film with a nominal ISO of 100 was exposed to a scene at ISOs from 25 to 400 and processed normally in the Kodak E-6 process then scanned with the Nikon LS 2000 scanner. Good color prints ere made from all exposures that were nearly identical in print quality after being color managed with a profile built from the Kodak ColorFlow 2.1 Software in a manner similar to Example 1.

Even the image exposed at ISO 400 showed less grain in the final print than prints from the ISO 400 color negative scans. The over and under exposed Ektachrome transparencies were too light or too dark for useful slides but all the necessary information was present for scanning and making acceptable prints from the reversal images once a profile was built from the Macbeth ColorChecker Test Chart.

EXAMPLE 3

Improved Exposure Latitude for Color Negative

Kodak Portra 400 film with a normal ISO of 400 was exposed at ISO's from 25 to 1600 and processed normally in C41 processing chemicals then scanned with a Nikon LS 2000 scanner.

Good digital color prints were made from all exposures that were nearly identical in print quality after being color managed with a profile built from the Kodak ColorFlow 2.1 Software in a manner similar to Example 1.

Even the image exposed at ISO 1600 produced pleasing color prints. The extreme over and under exposed negatives were very difficult to print optically but all the necessary information was present for scanning and making acceptable prints from the negatives once a profile was built from the Macbeth ColorChecker Test Chart which was in the scene, under the exposure conditions photographed.

The invention has been described in detail with particular reference to certain preferred embodiments thereof, but it will be understood that variations and modifications can be effected within the spirit and scope of the invention.

PARTS LIST 10 roll of film
12 exposure system
14 unprocesssed film
16 block
18 processed film with color test target patches
19 color patches
20 film scanner
22 computer to create profile and color corrected digital image
24 digital printer
26 final color corrected print
30 photographic film element
32 film support
34 blue sensitive layer
36 green sensitive layer
38 red sensitive layer
40 Colorimetric Data
42 Least-squares Regression
44 Device Code Values
46 Polynomial Model
48 Profile
50 Image Capture Device
52 Image Display Device
54 Image Data
56 Image Processing Software
58 Modified Image Data
60 Capture Device Profile
62 Display Device Profile

What is claimed is:

1. A color photographic film element, comprising:

a substrate and a plurality of image capture color photosensitive layers formed over the substrate, the substrate being divided into first and second regions with a scene image being captured in the first region; and a film processing and exposure conditions reference profile chart having patches including neutral patches ranging from white to black and color patches formed in the film element by exposure in the second region at a reference exposure prior to scene image capture, the color patches including information which permits the mapping of a digitized color image from a developed image captured in the color photosensitive layers to construct a color and density film to output device profile using the neutral patches ranging from white to black and the color patches to create a digital signal processing transform converting film color values to output device color values after scene image capture and having color management information usable in modifying the digital image by any digital device which is capable of using the profile to modify digital images for optimized presentation of the digital image and allowing processing to be customized from film element to film element.

2. A method of producing an improved digital image, comprising:

scanning a color photographic film which includes an image and a test chart added to the film prior to the capturing of the image and the chart having patches including neutral patches ranging from white to black and color patches including color management information which permits the mapping of a digitized color image from a developed image captured in the color photosensitive layers;

constructing a color and density profile using the neutral patches ranging from white to black and the color patches to create a digital signal processing transform converting film color values to output device color values after image capture from the scanned patches useable in modifying the digital image; and using the profile to modify the scanned digital image allowing film element by film element customized processing.

3. A print made in accordance with the method of claim 2.

4. The color photographic film element made in accordance with the method of claim 2.

5. A color photographic film element, comprising:

a substrate and a plurality of image capture color photosensitive layers formed over the substrate;

a region formed in the film element and for capturing an image;

a test chart having patches formed prior to image capture and in the film element by image exposure; and the patches including neutral patches ranging from white to black and color patches and color management information which permits the mapping of colors captured by the film element to construct a color and density profile using the neutral patches ranging from white to black and the color patches to create a digital signal processing transform converting film color values to printing output device color values after image capture which permits modifying the colors in a digitized image for printing the image originally captured by the film element allowing film element by film element customized processing.

6. A method of printing color digitized images produced from a developed color photographic film element having a captured image and a chart with patches formed in the color photographic film, the chart added to the film element prior to image capture, comprising:

digitizing the patches wherein the patches define a test chart and include neutral patches ranging from white to black and color patches;

building a color and density profile using the neutral patches ranging from white to black and the color patches to create a digital signal processing transform converting film color values to printing output device color values subsequent to image capture from the patches to include color management information to permit the printing of desired color and tone characteristics of the color digitized image; and using the profile to adjust signals sent to a digital printer which produces a print from the color digitized image allowing film element by film element customized processing.

7. A method for producing a color film element, comprising:

providing on a substrate a plurality of image capture color photosensitive layers formed over the substrate;

exposing a test chart having patches including neutral patches ranging from white to black and color patches onto the color film element which permits the use of color management information to map colors captured by the color film element to build a color and density profile using the neutral patches ranging from white to black and the color patches to create a digital signal processing transform converting film color values to printing output device color values to permit the printing of digitized images from developed color images; and capturing an image on the film element and with the profile allowing film element by film element customized processing.

\* \* \* \* \*